United States Patent [19]

Hannon et al.

[11] Patent Number: 4,908,847
[45] Date of Patent: Mar. 13, 1990

[54] ADAPTOR SET FOR CONVERTING STANDARD TELEPHONE INTO CORDLESS TELEPHONE

[75] Inventors: Charles J. Hannon, Clinton; Bruce M. Gallo, Chester, both of N.J.

[73] Assignee: Telcor, Inc., Chester, N.J.

[21] Appl. No.: 269,986

[22] Filed: Nov. 10, 1988

[51] Int. Cl.⁴ .............................................. H04M 1/02
[52] U.S. Cl. ........................................ 379/61; 379/58
[58] Field of Search ............................ 379/63, 61, 62

[56] References Cited

U.S. PATENT DOCUMENTS 3,919,491  11/1975  Luce .......................................... 379/61
4,752,949  6/1988  Steinbeck et al. ...................... 379/61
4,839,918  6/1989  Hata ........................................ 379/61

Primary Examiner—Robert Lev
Attorney, Agent, or Firm—Ostrolenk, Faber, Gerb & Soffen

[57] ABSTRACT

A conversion kit, consisting of a two piece adaptor set, allows a conventional non-cordless telephone to be converted to a cordless telephone. Each piece consists of a unitary body which houses a transmitter/receiver therein and a conventional modular male telephone plug. To convert a standard non-cordless telephone to a cordless telephone, the telephone cord is removed and one of the transmitter/receivers is plugged into the socket on the telephone base and the other into the corresponding cord socket on the handset.

15 Claims, 2 Drawing Sheets

ADAPTOR SET FOR CONVERTING STANDARD TELEPHONE INTO CORDLESS TELEPHONE

BACKGROUND OF THE INVENTION

The present invention relates to a conversion kit for converting a conventional telephone into a cordless telephone, and more particularly to a conversion kit consisting of a two piece adaptor set in which each piece comprises a transmitter/receiver and a modular telephone plug.

The familiar, conventional, non-cordless telephone consists of a telephone base, a handset, and an interconnecting cord between the telephone base and the handset. The cord, usually a coiled cord, is terminated at either end thereof by a modular, quick connect/disconnect, male telephone plug. The modular male plug on one end of the cord plugs into a corresponding modular female socket on the telephone base and the other end of the cord plugs into a similar socket on the handset. As used here, the term "modular telephone plug" refers to the familiar, standardized, four wire, male and female telephone plugs, that are exclusively used throughout the telephone industry.

A number of years ago cordless telephones were invented. In conventional cordless telephones, a first radio transmitter/receiver is located within the telephone base station and this first radio transmitter/receiver communicates with a corresponding transmitter/receiver that is built into the handset.

U.S. Pat. No. 3,919,491 to Luce and German OS No. 1 930 531 are illustrative of numerous patents which disclose cordless telephones.

U.S. Pat. No. 1,594,262 to Homer describes an external coupler which is connected by wires to a telephone instrument and which serves to receive radio signals and to transmit the radio signals through the telephone set over telephone utility lines.

U.S. Pat. No. 3,952,167 to Suzuki et al. discloses a coupler for a telephone which is used to connect the telephone to other communication facilities such as a facsimile transmitter/receiver. The coupler of this patent is not, however, utilized for transmitting and receiving voice communications between a telephone base and a telephone handset, nor is the coupler a wireless attachment.

A conventional non-cordless telephone cannot be converted to a cordless telephone. If a person wants to enjoy the advantages of a cordless telephone he or she must discard their conventional telephone and replace it with one of the numerous models of the especially designed and more expensive cordless telephones that are available on the market. From an economic point of view and for versatility, it would be advantageous to provide an ability to convert/upgrade a conventional telephone to a cordless telephone.

SUMMARY OF THE INVENTION

Accordingly, it is an object of the present invention to provide a telephone conversion kit for converting a conventional non-cordless telephone to a cordless telephone.

It is another object of the present invention to provide a two piece adaptor set for replacing the wire cord on a conventional telephone to provide wireless voice communication between a telephone base and its handset.

It is still a further object of the present invention to provide a conversion kit for enabling optional converting of a conventional telephone to a cordless telephone in a manner which permits ready restoring of the converted telephone to a conventional telephone.

The foregoing and other objects of the invention are realized by a telephone conversion kit that consists of a two piece adaptor set. Each piece of the adaptor set comprises a radio transmitter/receiver and a terminal means, for example, a modular male telephone plug, connected to the transmitter/receiver for providing quick connection/disconnection to telephone bases or handsets.

In accordance with the present invention, a conventional non-cordless telephone may be converted to a cordless telephone exceedingly rapidly and simply by removing the telephone cord between the telephone base and handset and replacing same with a first one of the adaptor pieces which is plugged into the telephone cord socket on the telephone base and the other piece into the telephone cord socket on the handset. The transmitter portion in the adaptor piece attached to the telephone base is designed to transmit, by radio waves or the like, sound originating in the telephone base to the receiver attached to the handset and, vice versa, the transmitter in the handset is adapted to transmit sound originating in the handset to the receiver connected to the telephone base, effectively providing cordless telephone operation. The two piece adaptor set may be easily disconnected from the telephone base and handset and the telephone cord replaced whenever this is desired.

In one embodiment, the modular male plug is connected to its transmitter/receiver by a short flexible cord, allowing the body of the transmitter/receiver to be located away from the telephone socket, on the telephone base, if the space near the socket is tight.

In another embodiment, the transmitter/receiver of the handset is shaped like and also forms a shoulder rest for the telephone handset.

Other features and advantages of the present invention will become apparent from the following description of the invention which refers to the accompanying drawings.

DETAILED DESCRIPTION OF THE DRAWINGS

Figure 1:
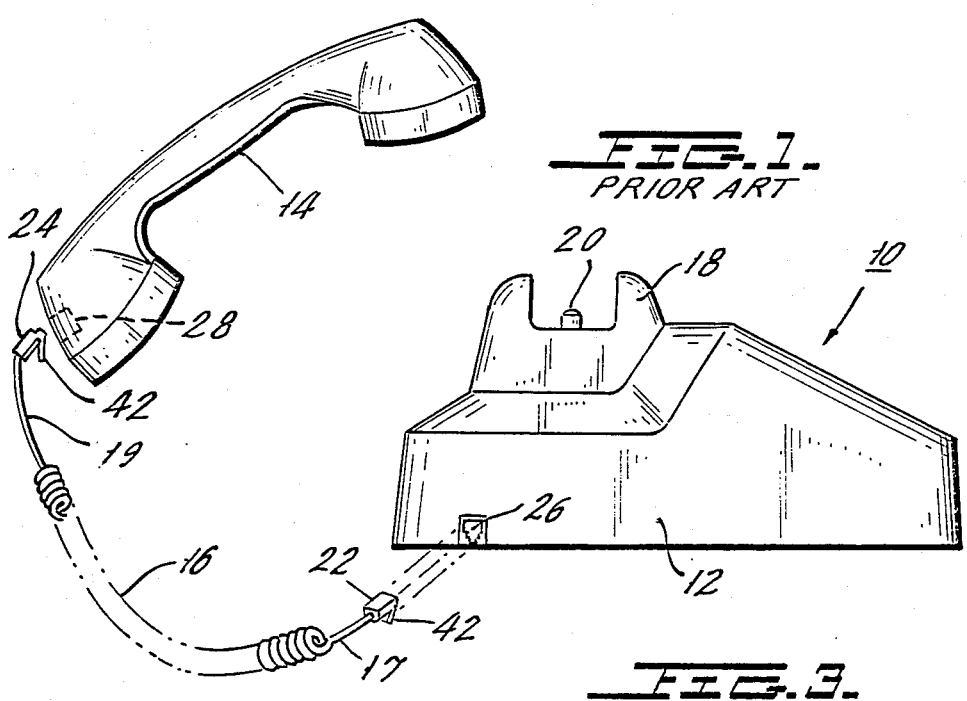
FIG. 1 shows a conventional prior art telephone.

Referring to the drawings, a conventional non-cordless telephone 10 consists of a base station 12, a handset 14 and a cord 16. When the telephone 10 is not being used, the handset 14 rests atop the cradle 18 of telephone base 12 and operates the hook switch 20 to enable receiving of incoming calls. The cord 16 is terminated at one end 17 thereof by a first modular male telephone plug 22 and by a similar plug 24 that is connected at the other end 19 thereof. Plug 22 is designed to plug into the modular female socket 26 on the telephone base 12 and, similarly, the other plug 24 is receivable in the telephone socket 28 on the telephone handset 14. The locking tab 42 on the plugs 22 and 24 serves to lock the plugs in the sockets 26/28. However, the free edge of the tab 42 which protrudes from the socket can be grasped and depressed to quickly free the plug from the socket 26 or 28.

As taught by the prior art, a conventional non-cordless telephone 10 as in FIG. 1 can not be converted into a cordless telephone. Consequently, those desiring to enjoy the advantages of a cordless telephone must replace their conventional telephone with a more expensive, especially designed, cordless telephone model.

Figure 2:
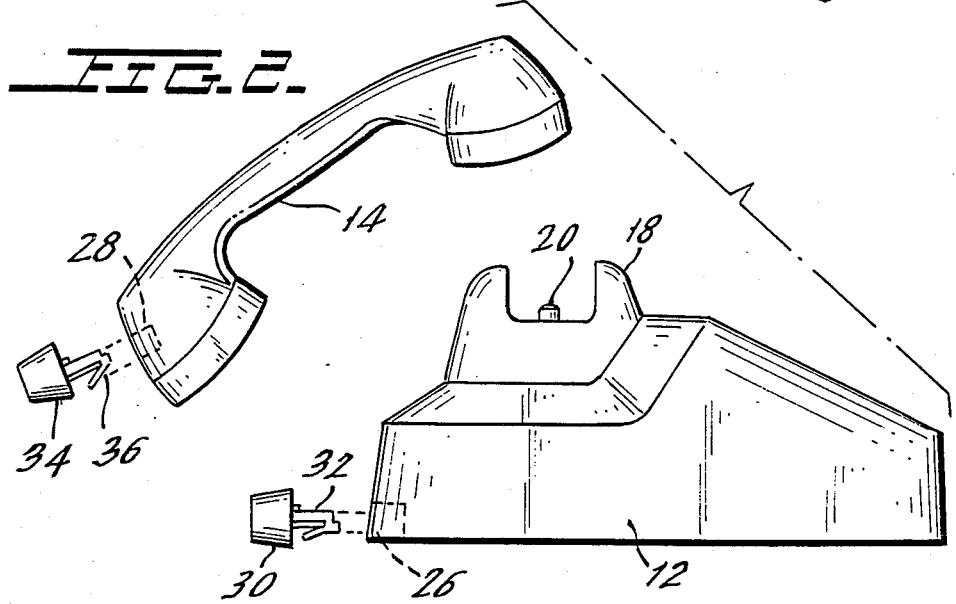
FIG. 2 shows the conventional prior art telephone of FIG. 1 wherein its cord has been removed and replaced by a pair of transmitters/receivers.

However, in accordance with the present invention and as illustrated in FIG. 2, the present invention enables the conventional telephone 10 of FIG. 1 to be converted to a cordless telephone in a rather simple and straightforward manner. To this end, the present invention provides a first transmitter/receiver element 30 that is especially designed to be plugged directly into the female socket 26 of the telephone base 12 by means of the modular male telephone plug 32 attached thereto.

A similar second transmitter/receiver element 34 with a modular male telephone plug 36 is designed for being plugged into the female modular telephone socket 28 on the handset 14.

As has been noted, the transmitter portion in the transmitter/receiver element 30 serves to transmit to the receiver in the other transmitter/receiver element 34, sound originating in the telephone base 12, by radio or similar waves. Similarly, sound originating in the handset 14 is transmitted from the transmitter of the element 34 to the receiver in the element 30. Details of the transmitter/receiver circuits in the elements 30 and 34 are well known to those skilled in the art and need not be reiterated herein. Illustrative transmitter/receiver circuits for cordless telephones are described, for example, in the following U.S. Pat. Nos.: 4,241,236; 4,238,850; 4,228,320; 4,224,482; 4,221,932; 4,213,009; 4,184,052; 4,159,448; 4,061,880; 4,057,781; 4,053,717; 4,039,760; and 4,032,723. The contents of the aforesaid patents are incorporated by reference herein.

Figure 3:
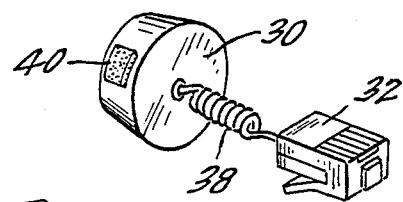
FIG. 3 shows an embodiment wherein at least one of the transmitters/receivers has its male plug connected thereto by a short wire.

Sometimes, the telephone base 12, or a similar wall mounted unit, may be located in a tight space where it would be difficult to accommodate the body of the transmitter/receiver element 30 near the telephone socket 26. Accordingly, FIG. 3 illustrates a variant embodiment in which the first transmitter/receiver element 30 and its male modular plug 32 are connected to one another by a relatively short cord 38. The cord 38 allows the body of the transmitter/receiver 30 to be located away from the modular telephone socket 26 of telephone base 12. In addition, the transmitter/receiver may include a mounting element 40, consisting of a Velcro swatch, an adherable pad or the like, that is suitable for attaching the body of the transmitter/receiver element 30 to the outer surface of the telephone base 12 or to any other surface, if desired. Generally speaking, each of the transmitter/receiver elements 30 and 34 may have a shape, manner of interconnection to its plug 32 or 36, and other features modeled after the present assignee's telephone connectors described in U.S. Pat. Nos. 4,699,591 and 4,669,592, the contents of which are incorporated by reference herein.

The transmitter/receiver element 34, of the telephone handset 14, may be too bulky to hang from the cord socket 28 of handset 14. Accordingly, in the embodiment of FIG. 4, a modified transmitter/receiver element 44 is disposed within a handset shoulder rest 46. The shoulder rest 46 is preferably in the form of a molded rubber cushion having a shoulder conforming surface 50 and an oppositely located adherable surface 52 for adherably supporting the telephone handset 14. The adherable surface 52 of the shoulder rest 46 may be constituted by an adhesive pad.

The modified transmitter/receiver element 44 is designed to communicate with the handset 14, via a short cord 56, the cord 56 being connected at the female socket 54 of the shoulder rest 46 at one end thereof and in the socket 28 of the handset 14, at the other end thereof.

Figure 4:
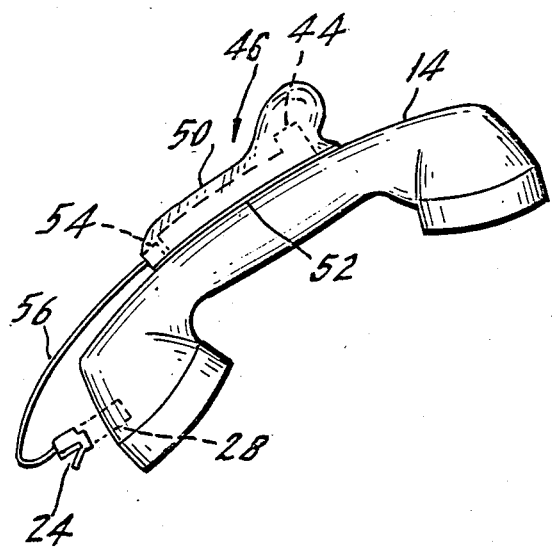
FIG. 4 shows a further development of the invention wherein the transmitter/receiver of the telephone handset is embedded in and constitutes a handset shoulder rest.

The shoulder rest and transmitter/receiver combination of FIG. 4 thus serves the dual function of improving the mobility of the handset 14 of the present invention and providing a convenient location for the transmitter/receiver element 44. The structure of FIG. 4 also could form or provide a more suitable anchoring location for an antenna (not shown). In any case, configuring of the modified transmitter/receiver element 44 as a telephone shoulder rest solves the problem of supporting a somewhat bulky transmitter/receiver from the female modular telephone socket 28 of the handset 14.

As described above, the present invention provides a simple conversion kit consisting of a two piece adaptor set which includes the first and second transmitter/receiver elements 30 and 34. The invention makes it possible to convert, in a matter of seconds, a conventional telephone 10 as in FIG. 1 to a cordless telephone as in FIG. 2, through simple removing of the cord 16 and the replacement thereof by the transmitter/receiver elements 30 and 34. The conversion kit can be carried in one's pocket, purse or the like to enable converting any telephone, as for example a hotel telephone, to a cordless telephone.

The first transmitter/receiver element 30 is designed to be connected to the telephone base 12 and could derive its power from the telephone lines. The other transmitter/receiver element 34 is battery operated and may be provided with a replaceable battery (not shown). Preliminary investigations indicate that such battery could last for about three months. Cordless operation over a radius measuring about 25 feet from the telephone base 12 can easily be obtained. The transmitter/receiver elements 30 and 34 of the invention are modularly constructed and may be provided with an adjustable potentiometer to provide impedance matching for different phones.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A conversion kit for converting a conventional non-cordless telephone to a cordless telephone, the conversion kit comprising:
   a first transmitter/receiver for transmitting and receiving waves and a respective terminal means for enabling the first transmitter/receiver to be electrically connected to a non-cordless telephone base; and a second transmitter/receiver for transmitting and receiving waves and for communicating wirelessly with the first transmitter/receiver, the second transmitter/receiver having a respective terminal means for connecting the second transmitter/receiver to a non-cordless telephone handset.

2. The conversion kit of claim 1, wherein the respective terminal means of the first and second transmitter/receiver comprises a respective modular male telephone plug.

3. The conversion kit of claim 2, wherein the first transmitter/receiver comprises a transmitter/receiver body and the respective modular plug of the first transmitter/receiver is connected directly to the first transmitter/receiver body and further wherein the second transmitter/receiver has a respective transmitter/receiver body and the respective modular plug of the second transmitter/receiver is connected directly to the transmitter/receiver body of the second transmitter/receiver.

4. The conversion kit of claim 3, further including telephone mounting means connected to the first transmitter/receiver body.

5. The conversion kit of claim 2, wherein the modular plug on the first transmitter/receiver is physically spaced from the first transmitter/receiver and including a cord extending between the first transmitter/receiver and its respective modular male telephone plug.

6. The conversion kit of claim 1, further including a respective locking tab on each of the terminal means associated with the first and second transmitter/receiver, the locking tab being effective for locking the terminal means within and releasing the terminal means from the sockets on the telephone base and the telephone handset.

7. The conversion kit of claim 2, further including a handset shoulder rest, the second transmitter/receiver being disposed in the handset shoulder rest, and including a telephone cord for connecting the second transmitter/receiver to a cord socket on the telephone handset.

8. The conversion kit of claim 7, wherein the handset shoulder rest comprises a molded rubber cushion and means for mounting the telephone handset to the handset shoulder rest.

9. The conversion kit of claim 7, further including a modular telephone socket on the handset shoulder rest for connecting therethrough one end of the telephone cord to the second transmitter/receiver.

10. A telephone, comprising:
a non-cordless telephone base having a respective modular socket suitable for accommodating a corresponding modular male plug of a telephone cord;
a non-cordless telephone handset having a respective modular socket suitable for accommodating a corresponding modular male plug of a telephone cord;
a first transmitter/receiver for transmitting and receiving waves and a respective modular male telephone plug connected to the first transmitter/receiver and effective for enabling the first transmitter/receiver to be electrically connected to the modular socket on the telephone base; and
a second transmitter/receiver for transmitting and receiving waves and for communicating wirelessly with the first transmitter/receiver, the second transmitter/receiver having a respective modular male telephone plug connected thereto, the modular male plug of the telephone handset being effective for connecting the second transmitter/receiver to the modular socket on the telephone handset.

11. The telephone of claim 10, wherein the first and second transmitter/receiver are effective for communicating with one another through radio waves.

12. The telephone of claim 10, wherein the first transmitter/receiver comprises a transmitter/receiver body and the respective modular plug of the first transmitter/receiver is connected directly to the first transmitter/receiver body and further wherein the second transmitter/receiver has a respective transmitter/receiver body and the respective modular plug of the second transmitter/receiver is connected directly to the transmitter/receiver body of the second transmitter/receiver.

13. The telephone of claim 10, further including telephone mounting means connected to the first transmitter/receiver body.

14. The telephone of claim 10, further including a handset shoulder rest, the second transmitter/receiver being disposed in the handset shoulder rest, and including a telephone cord for connecting the second transmitter/receiver to the cord socket on the telephone handset.

15. The telephone of claim 14, further including a modular telephone socket on the handset shoulder rest for connecting therethrough one end of the telephone cord to the second transmitter/receiver.

* * * * *